US006752979B1

(12) United States Patent
Talbot et al.

(10) Patent No.: US 6,752,979 B1
(45) Date of Patent: Jun. 22, 2004

(54) PRODUCTION OF METAL OXIDE PARTICLES WITH NANO-SIZED GRAINS

(75) Inventors: Peter Cade Talbot, Queensland (AU); Jose Antonio Alarco, Queensland (AU); Geoffrey Alan Edwards, Queensland (AU)

(73) Assignee: Very Small Particle Company Pty Ltd, Richlands (AU)

( * ) Notice: Subject to any disclaimer, the term of this patent is extended or adjusted under 35 U.S.C. 154(b) by 0 days.

(21) Appl. No.: 09/721,490

(22) Filed: Nov. 21, 2000

(51) Int. Cl.[7] .......................... C01B 13/00; C01F 17/00
(52) U.S. Cl. .............................. 423/592.1; 423/593.1; 423/263
(58) Field of Search ................................ 423/592, 593, 423/263, 593.1, 592.1, 249, 617, 618, 619, 624, 625, 606, 607, 608, 594.1–605, 609–612, 615, 616, 622, 632, 636–639, 641–594.19, 250–252, 260, 261

(56) References Cited

U.S. PATENT DOCUMENTS

| 5,093,289 A | | 3/1992 | Braetsch et al. | |
|---|---|---|---|---|
| 5,698,483 A | | 12/1997 | Ong et al. | |
| 5,770,172 A | * | 6/1998 | Linehan et al. | 423/558 |
| 5,788,950 A | * | 8/1998 | Imamura et al. | 423/598 |
| 5,879,715 A | * | 3/1999 | Higgins et al. | 423/659 |
| 5,935,275 A | | 8/1999 | Burgard et al. | |
| 5,958,367 A | | 9/1999 | Ying et al. | |
| 6,133,194 A | | 10/2000 | Cuif et al. | |
| 6,139,816 A | * | 10/2000 | Liu et al. | 423/608 |
| 6,328,947 B1 | * | 12/2001 | Monden et al. | 423/608 |

FOREIGN PATENT DOCUMENTS

| DE | 19852547 A1 | 5/2000 |
|---|---|---|
| WO | WO99/00536 | 1/1999 |

OTHER PUBLICATIONS

Antonelli and Ying, *Synthesis of Hexagonally Packed Mesoporous Tio$_2$ by a Modified Sol gel Method*, 34,18 Angew. Chem. Int. Ed. Engl., 2014–2017 (1995), no month.
Attard, Bartlett, Coleman, Elliot and Owen, *Lyotropic Liquid Crystalline Properties of Nonionic Surfactant/H$_2$O/Hexachloroplatinic Acid Ternary Mixtures Used for the Production of Nanostructured Platinum*, 14 Langmuir 7340–7342 (1998), Dec.
Attard, Bartlett, Coleman, Elliot, Owen, and Wang, *Mesoporous Platinum Films From Lyotropic Liquid Crystalline Phases*, 278 Science 838–840 (1997), Oct.
Attard, Edgar and Göltner, *Inorganic Nanostructures From Lyotropic Liquid Crystal Phases*, 46 Acta mater 751–758 (1998), no month.
Attard, Glyde and Göltner, *Liquid–Crystalline Phases as Templates for the Synthesis of Mesoporous Silica*, 378 Nature 366–368 (1995), Nov.

Beck, Vartuli, Kennedy, Kresge, Roth and Schramm, *Molecular or Supramolecular Templating: Defining the Role of Surfactant Chemistry in the Formation of the Microporous and Mesoporous Molecular Sieves*, 6 Chem. Mater. 1816–1821 (1994), no month.
Beck, Vartuli, Roth, Leonowicz, Kresge, Schmitt, Chu, Olson, Sheppard, McCullen, Higgins and Schlenker, *A New Family of Mesoporous Molecular Sieves Prepared With Liquid Crystal Templates*, 114 J. Am. Chem. Soc. 10834–10843 (1992), no month.
Braun, Osenar and Stupp, *Semiconducting Superlattics Templated by Molecular Assemblies*, 380 Nature 325–327 (1996), Mar.
Hahn, *Gas Phase Synthesis of Nanocrystalline Materilas*, 9 Nanostructured Materilas 3–12 (1997), no month.
Koch, *Synthesis of Nanostructured Materials by Mechanical Milling: Problems and Opportunities*, 9 Nanostructured Materials13–22 (1997), no month.
Kresge, Leonowicz, Roth, Vartuli and Beck, *Ordered Mesoporous Molecular Sieves Synthesized by a Liquid–Crystal Template Mechanism*, 359 Nature 710–712 (1992), Oct.
McGrath, Dabbs, Yao, Aksay, Gruner, *Formation of a Silicate $L_3$ Phase With Continuously Adjustable Pore Sizes*, 277 Science 552–556 (1997), Jul.
Whitehead, Elliot, Owen and Attard, *Electrodeposition of Mesoporous Tin Films*, Chem. Commun. 331–332 (1999), no month.
Yang, Zhao, Margolese, Chmelka and Stucky, *Generalized Syntheses of Large–Pore Mesoporous Metal Oxides With Semicrystalline Frameworks*, 396 Nature 152–155 (1998), Nov.
Zhao, Feng, Huo, Melosh, Fredrickson, Chmelka and Stucky, *Triblock Copolymer Syntheses of Mesoporous Silica With Periodic 50 to 300 Angstrom Pores*, 279 Science 548–552 (1998), Jan.
Zhao, Huo, Feng, Chmelka, and Stucky, *Nonionic Triblock and Star Diblock Copolymer and Oligomeric Surfactant Syntheses of Highly Ordered Hydrothermally Stable, Mesoporous Silica Structures*, 120 J. Am. Chem. Soc. 6024–6036 (1998), Jun.
Aksay, I.A., Trau, M., Manne, S., Honma, I., Yao, N., Zhou, L., Fenter, P., Eisenberger, P.M., Grune, S.M., "Biomimetic Pathways for Assembling Inorganic Thin Films," Science273:892–898 (1996), Aug.

(List continued on next page.)

*Primary Examiner*—Steven Bos
(74) *Attorney, Agent, or Firm*—Christensen O'Connor Johnson Kindness PLLC (57) ABSTRACT

A method for producing metal oxide particles having nano-sized grains is disclosed. A solution of metal cations is mixed with surfactant under conditions such that surfactant micelles are formed. This mixture is then heated to form the metal oxide particles; this heating step removing the surfactant, forming the metal oxide and creating the pore structure of the particles. The pore structures are disordered. This method is particularly advantageous for production of complex (multi-component) metal oxides in which the different atomic species are homogeneously dispersed.

14 Claims, 10 Drawing Sheets

OTHER PUBLICATIONS

Eastoe, J. and Warne, B., "Nanoparticle and Polymer Synthesis in Microemulsion," *Current Opinion in Colloid and Interface Science* 1:800–805 (1996), no month.

Lopez–Quintela, et al., "Nanoscale Magnetic Particles: Synthesis, Structure and Dynamics," *Current Opinion in Colloid and Interface Science* 1:806–819 (1996), no month.

Froba, M., Muth, O. and Reller, A., "Mesostructured $TiO_2$: Ligand–stabilised Synthesis and Characterisation," *Solid State Ionics* 101–103:249–253 (1997), no month.

Tohver, V., et al,, "Countering Effects in Liquid Crystal Templating of Nanostructured CdS," *Chemistry of Materials* 9(7):1495 (1997), Jul.

Yang, P., et al., "Generalized Synthesis of Large–Pore Mesoporous Metal Oxides With Semicrystalline Frameworks," *Nature* 396:152–155, 1998, Nov.

* cited by examiner

Figure 1

Typical XRD pattern from a surfactant-templated material.

Figure 2

Typical pore size distribution from a surfactant-templated material.

Figure 3

In Example 1- Production of CeO2. Temperature history.

XRD traces from $CeO_2$, $Ce0.6Sm0.4Ox$, $Ce0.65Sm0.2Cu0.15Ox$, $Ce0.6Zr0.2Sm0.1Cu0.1Ox$

Figure 7

SAXS data for gels comprised of cerium nitrate solutions and Brij 35, Brij 56 and Pluronic F127 surfactants. Also shown is SAXS data from the powders produced from these gels.

Pore size distribution from CeO$_2$ powder made using Brij 35 surfactant (surface area = 253m$^2$/g)

*Figure 8*

Comparison of above data with a typical pore size distribution from a surfactant-templated material.

XRD trace from $La_{0.6}Ca_{0.2}Nd_{0.2}Mn_{0.9}Ni_{0.1}O_3$

Figure 11

SAXS data from $La_{0.6}Ca_{0.2}Nd_{0.2}Mn_{0.9}Ni_{0.1}O_3$

Figure 12

Heat treatment schedules for CeO$_2$ materials in "Experiments in Step 2: Mixing the Solution with Surfactant".

Figure 13

PRODUCTION OF METAL OXIDE PARTICLES WITH NANO-SIZED GRAINS

FIELD OF THE INVENTION

The present invention relates to very fine-grained particulate material and to methods for producing such very fine-grained particulate material. In preferred aspects, the present invention relates to oxide materials of very fine-grained particulate material and to methods for producing such material. Most suitably, the particulate material has grain sizes in the nanometer scale.

BACKGROUND OF THE INVENTION

Metal oxides are used in a wide range of applications. For example, metal oxides can be used in:

- solid oxide fuel cells (in the cathode, anode, electrolyte and interconnect);
- catalytic materials (automobile exhausts, emission control, chemical synthesis, oil refinery, waste management);
- magnetic materials;
- superconducting ceramics;
- optoelectric materials;
- sensors (eg gas sensors, fuel control for engines);
- structural ceramics (eg artificial joints).

Conventional metal oxides typically have grain sizes that fall within the micrometer range and often are supplied in the form of particles having particle sizes greater than the micrometer range. It is believed that metal oxides that are comprised of nanometer sized grains will have important advantages over conventional metal oxides. These advantages include lower sintering temperatures, potentially very high surface areas, and sometimes improved or unusual physical properties. However, the ability to economically produce useful metal oxide materials with nanometer-sized grains has proven to be a major challenge to materials science. It has proven to be difficult to make such fine-scale metal oxides, particularly multi-component metal oxides, with:

(a) the correct chemical composition;
(b) a uniform distribution of different atomic species;
(c) the correct crystal structure; and
(d) a low cost.

Many important metal oxides have not yet been produced with very fine grains, especially multi-component metal oxides. This is because as the number of different elements in an oxide increases, it becomes more difficult to uniformly disperse the different elements at the ultra-fine scales required for nanometer-sized grains. A literature search conducted by the present inventors has shown that very small grain sizes (less than 20 nm) have only been attained for a limited number of metal oxides. The reported processes used to achieve fine grain size are very expensive, have low yields and can be difficult to scale up. Many of the fine grained materials that have been produced do not display particularly high surface areas, indicating poor packing of grains.

At this stage, it will be realised that particles of material are typically agglomerated of a number of grains. Each grain may be thought of as a region of distinct crystallinity joined to other grains. The grains may have grain boundaries that are adjacent to other grain boundaries. Alternatively, some of the grains may be surrounded by and agglomerated with other grains by regions having a different composition (for example, a metal, alloy or amiorphous material) to the grains.

Methods described in the prior art for synthesising nano materials include gas phase synthesis, ball milling, co-precipitation, sol gel, and micro emulsion methods. The methods are typically applicable to different groups of materials, such as metals, alloys, intermetallics, oxides and non-oxides. A brief discussion of each will follow:

Gas-Phase Synthesis

Several methods exist for the synthesis of nano-particles in the gas phase. These include Gas Condensation Processing, Chemical Vapour Condensation, Microwave Plasma Processing and Combustion Flame Synthesis (H. Hahn, "Gas Phase Synthesis of Nanocrystalline Materials", Nano Structured Materials, Vol 9, pp 3–12, 1997). In these methods the starting materials (suitable precursors to a metal, alloy or an inorganic material) are vaporised using energy sources such as Joule heated refractory crucibles, electron beam evaporation devices, sputtering sources, hot wall reactors, etc. Nano-sized clusters are then condensed from the vapour in the vicinity of the source by homogenous nucleation. The clusters are subsequently collected using a mechanical filter or a cold finger. These methods produce small amounts of non-agglomerated material, with a few tens of gram/hour quoted as a significant achievement in production rate.

Ball Milling

Mechanical attrition or ball milling is another method that can be used to produce nano-crystalline materials (C. C. Koch, "Synthesis of Nanostructured Materials by Mechanical Milling: Problems and Opportunities", Nano Structured Materials, Vol 9, pp 13–22, 1997). Unlike the aforementioned methods, mechanical attrition produces the nano-materials not by cluster assembly but by the structural decomposition of coarser-grained materials as a result of severe plastic deformation. The quality of the final product is a function of the milling energy, time and temperature. To achieve grain sizes of a few nanometers in diameter requires relatively long processing times (several hours for small batches). Another main drawback of the method is that the milled material is prone to severe contamination from the milling media.

Co-Precipitation

In some special cases it is possible to produce nano-crystalline materials by precipitation or co-precipitation if reaction conditions and post-treatment conditions are carefully controlled (L. V. Interrante and M. J. Harnpden-Smith), *Chemistry of Advanced Materials—An Overview*, Wiley—VCH (1998)). Precipitation reactions are among the most common and efficient types of chemical reactions used to produce inorganic materials at industrial scale. In a precipitation reaction, typically, two homogenous solutions are mixed and an insoluble substance (a solid) is subsequently formed. Conventionally, one solution is injected into a tank of the second solution in order to induce precipitation, however, simultaneous injection of the two solutions is also possible. The solid that forms (called the precipitate) can be recovered by methods such as filtration.

The precursor material has subsequently to be calcined in order to obtain the final phase pure material. This requires, in particular, avoidance of phenomena that induce segregation of species during processing such as partial melting for example. Formation of stable intermediates also has to be avoided since the transformation to the final phase pure material might become nearly impossible in that case. Typical results for surface areas for single oxides can be of several tens of m²/g. However, for a multi-cation compound, values less than 10 m²/g become common.

Sol-gel Synthesis

Sol-gel synthesis is also a precipitation-based method. Particles or gels are formed by 'hydrolysis-condensation reactions', which involve first hydrolysis of a precursor, followed by polymerisation of these hydrolysed percursors into particles or three-dimensional networks. By controlling the hydrolysis-condensation reactions, particles with very uniform size distributions can be precipitated. The disadvantages of sol-gel methods are that the precursors can be expensive, careful control of the hydrolysis-condensation reactions is required, and the reactions can be slow.

Microemulsion Methods

Microemulsion methods create nanometer-sized particles by confining inorganic reactions to nanometer-sized aqueous domains, that exist within an oil. These domains, called water-in-oil or inverse microemulsions, can be created using certain surfactant/water/oil combinations.

Nanometer-sized particles can be made by preparing two different inverse microemulsions (eg (a) and (b)). Each microemulsion has a specific reactant dissolved in the aqueous domains. The inverse microemulsions are mixed, and when the aqueous domains in (a) collide with those in (b), a reaction takes place that forms a particle. Since the reaction volumes are small, the resultant particles are also small. Some microemulsion techniques are reviewed in "Nanoparticle and Polymer Synthesis in Microemulsion", J. Eastoe and B. Warne, *Current Opinion in Colloid and Interface Science*, vol. 1 (1996), p800–805, and "Nanoscale Magnetic Particles: Synthesis, Structure and Dynamics", ibid, vol. 1 (1996), p806–819.

A major problem with this technique is that the yield (wt product/wt solution) is small. Most microemulsion systems contain less than ~20 vol % aqueous domains, which reduces the yield from the aqueous phase reactions by a factor of ~5. Many of the aqueous phase reactions themselves already have low yields, therefore a further significant reduction in yield is very undesirable. The method also requires removal of particles from the oil, This can be very difficult for nanosised particles surrounded by surfactant, since these particles can remain suspended in solution, and are very difficult to filter due to their small size. Once the particles are separated, residual oil and surfactant still needs to be removed. Another serious disadvantage is that reaction times can be quite long. These aspects together would greatly increase the size, complexity and cost of any commercial production facility.

Use of Surfactants

Recently, there has been considerable research and development into the production of high surface area metal oxides using "surfactant templating". Surfactants are organic (carbon-based) molecules. The molecules have a hydrophilic (ie has an affinity for water) section and a hydrophobic (ie does not have an affinity for water) section.

Surfactants can form a variety of structures in aqueous (and other) solutions dependent upon the type of surfactant, the surfactant concentration, temperature, ionic species, etc. The simplest arrangement is individual surfactant molecules dispersed in solution. This typically occurs for very low concentration of surfactants. For higher concentrations of surfactant, the surfactant can coalesce to form "micelles". Micelles can be spherical or cylindrical. The diameter of the micelle is controlled mainly by the length of the surfactant chain and can range between ~20 angstroms and ~300 angstroms.

Even higher concentrations of surfactant give rise to more ordered structures called "liquid crystals". Liquid crystals consist of ordered micelles (eg micellar cubic, hexagonal) or ordered arrays of surfactant (eg lamella, bicontinuous cubic), within a solvent, usually water.

A paper published by C T Kresge, M E Leonowicz, W J Roth, J C Varruli and J S Beck, "*Ordered Mesoporous Molecular Sieves Synthesized by a Liquid Crystal Template Mechanism*", Nature, vol 359 (1992) p710–712, described the production of inorganic materials having ordered porosity. In the process described in this paper, an ordered array of surfactant molecules was used to provide a "template" for the formation of the inorganic material. The basic premise for this process was to use the surfactant structures as a framework and deposit inorganic material onto or around the surfactant structures. The surfactant is then removed (commonly by burning out or dissolution) to leave a porous network that mimics the original surfactant structure. The process is shown schematically in FIG. 1. Since the diameter of the surfactant micelles can be extremely small, the pore sizes that can be created using the method are also extremely small, and this leads to very high surface areas in the final product.

There are several characteristic features of the materials that have been produced using surfactant templating process as described above:

(a) An Ordered Pore Structure

Figure 1:
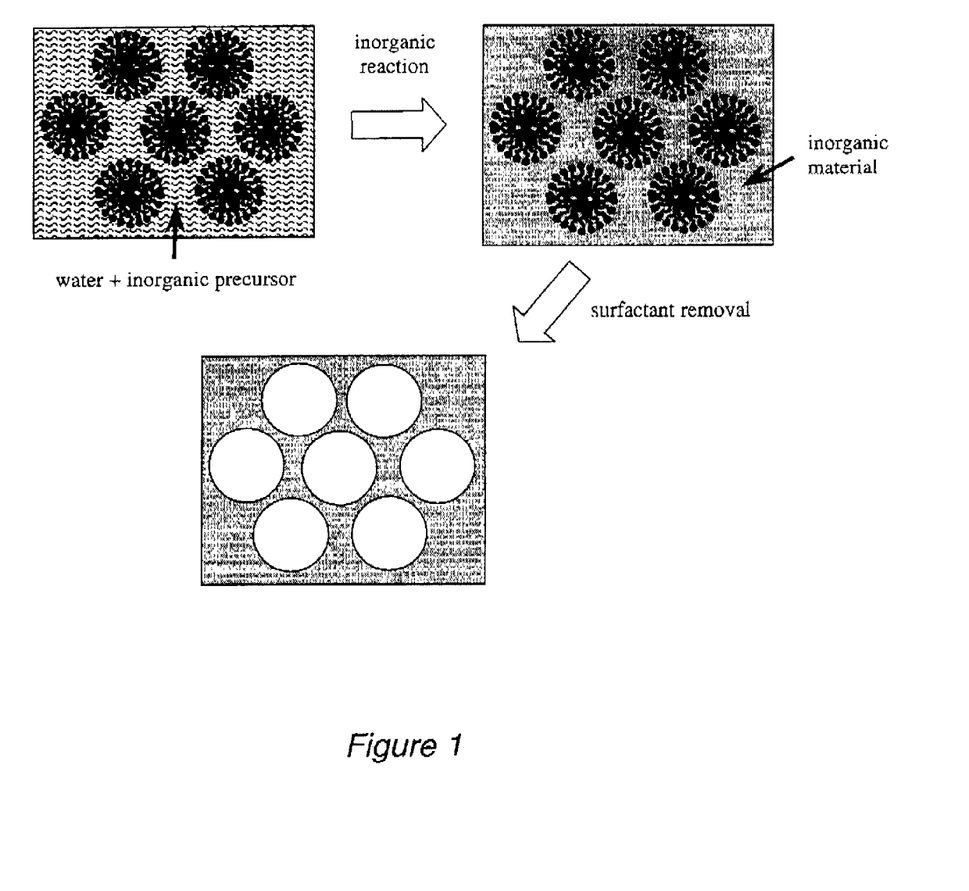
FIG. 1 is a schematic diagram showing a surfactant-templating method.

As shown in FIG. 1, surfactant-templating methods use ordered surfactant structures to template deposition of inorganic material. The surfactant is then removed without destroying the ordered structure. This results in an ordered pore network, which mimics the surfactant structure.

The size of the pores, the spacing between pores, and the type of ordered pore pattern are dependent upon the type of surfactant, the concentration of the surfactant, temperature and other solution variables. Pores sizes between ~20 angstroms and ~300 angstroms have been achieved. Spacings between the pores also lie approximately within this range.

Figure 2:
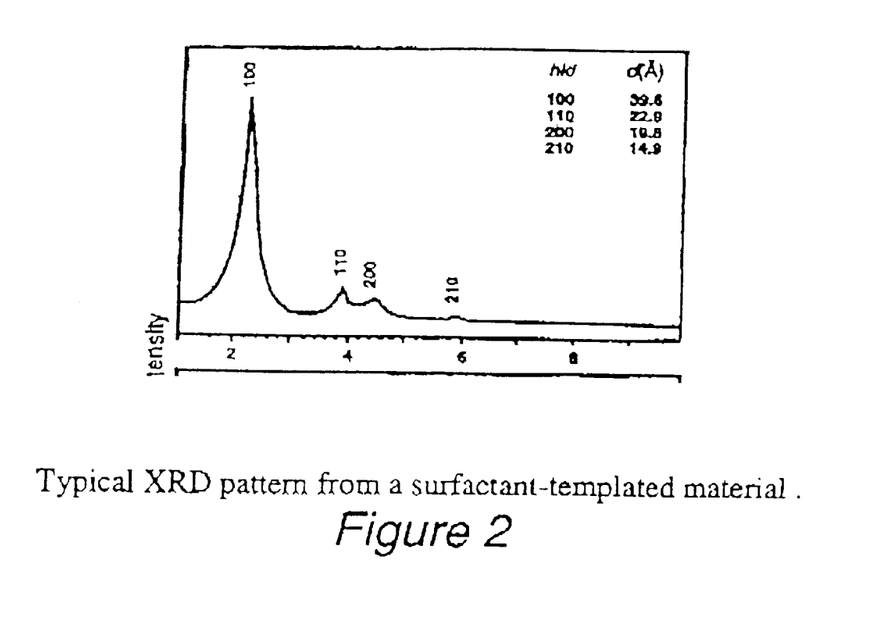
FIG. 2 is an X-ray diffraction scan of a surfactant-templated material.

Periodic order at this scale can be detected using x-ray diffraction (XRD). In an XRD scan, signal intensity is plotted against the angle of the incident x-ray beam on the sample. Periodic structures give rise to peaks on XRD scans. The length of the periodic spacing is inversely related to the angle at which the peak occurs. Periodic arrangements of atorns (crystals), in which the spacings are very small, produce peaks at so-called 'high angles' (typically>5°). The ordered pore structures in surfactant-templated materials have much greater spacings, and therefore produce peaks at low angles (typically much less than 5°). A special XRD instrument, called a small angle x-ray scattering (SAXS) instrument, is commonly used to examine the pore structure in surfactant templated materials. An example of an XRD scan from a surfactant-templated material is shown in FIG. 2.

(b) Uniform Pore Size

Figure 3:
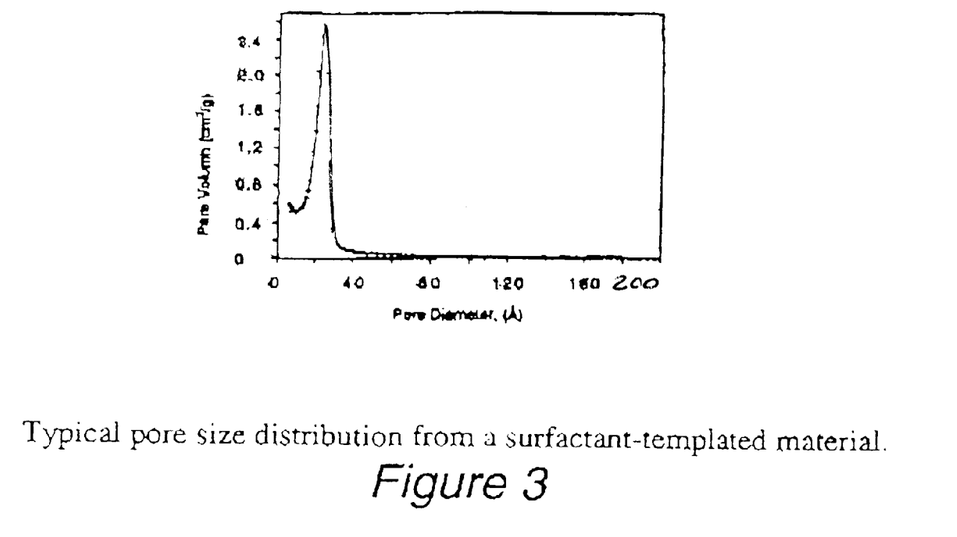
FIG. 3 is a graph of pore size distribution of a surfactant-templated material.

For a given type of surfactant, surfactant micelles are essentially the same size. Pore sizes are therefore very uniform since pores are created in the space that was occupied by the micelles. Pore size distributions in materials may be obtained using nitrogen gas absorption instruments. An example of a pore size distribution from a surfactant-templated material is shown in FIG. 3. The distribution is extremely narrow, and is approximately cantered on the diameter of the surfactant micelles. Such distributions are typical for surfactant templated materials.

(c) Absence of atomic crystallinity (i.e. absence of highly ordered atomic structures).

Most conventional inorganic materials are crystalline. That is, their atoms are organised into highly ordered periodic structures. The type, amount and orientation of crystals in inorganic materials critically influences many important physical properties. A major drawback of most surfactant-templated materials is that normally the inorganic material is not highly crystalline. In fact in most cases it is considered amorphous.

The difficulties in producing highly crystalline materials derive from restrictions imposed by the very nature of surfactant templating. These restrictions greatly limit the types of reactions that can be used to form inorganic material. Obviously the inorganic material must form whilst the surfactant structure is preserved. Since the surfactant structure normally exists in an aqueous-based solution, the inorganic reactions must be aqueous-based, and must occur at temperatures less than 100° C. This restriction is severe. Many conventional metal oxide materials, particularly complex multi-component oxides, require heat treatments at very high temperatures (up to 1200C.°) in order to achieve the correct crystal structure and a uniform dispersion of elements.

(c) Long reaction times

Most surfactant-templating methods require long reaction times to form the surfactant-inorganic structure. Following this, extended and careful heat treatment is usually necessary to remove the surfactant. Long reaction times greatly add to the expense and inconvenience of processing at a practical scale. The long reaction times again can be attributed to the types of inorganic reactions that must be employed in surfactant templating.

A variant on the surfactant templating method described above may be described as the production of surfactant-templated structures via self assembly. Many of the detailed mechanisms of this process are not clear, however the basic principle is that the surfactant-inorganic structures assemble at a substrate or a nucleus and grow from there. A general review of this method is given by Aksay-IA; Trau-M; Manne-S; Honma-I; Yao-N; Zhou-L; Fenter-P; Eisenberger-PM; Grune-SM "Biomimetic pathways for assembling inorganic thin film", *Science* vol. 273 (1996), p 892–898.

In self-assembly, the solution must be carefully controlled so that inorganic deposition only occurs on the assembling surfactant structure. If the inorganic phase forms too rapidly, then large inorganic precipitates that do not contain surfactant will form and drop out of solution. Clearly this would result in a non-porous structure.

The inorganic reactions that have mostly been employed in self-assembly (and other surfactant-templating methods as well) are called 'hydrolysis-condensation' reactions. Hydrolysis-condensation reactions involve an 'inorganic precursor', which is initially dissolved in solution. The first step in the reaction is hudrolysis of the precursor. This is followed by polymerisation of the hydrolysed precursor (condensation) to form an inorganic phase. Hydrolysis-condensation reactions may be represented generally as:

$M-OR+H_2O \Rightarrow M-OH+ROH$ hydrolysis $M-OH+M-OR \Rightarrow M-O-M+ROH$ condensation M=a metal ion
R=an organic ligand, e.g. $CH_3$ M-OR=inorganic precursor, commonly an alkoxide The polymerisation nature of these reactions results in glass-like materials that do not contain a high degree of atomic order. As discussed previously this is a major limitation of most surfactant-templated materials. It is possible to increase the order in the inorganic material by heat treating at high temperatures, but almost all attempts to do this have resulted in collapse of the pore structure prior to crystallisation.

Most hydrolysis-condensation reactions are too rapid in aqueous solutions to be useful for surfactant templating. Silica-based reactions are an exception, and can be controlled very well. This explains why, for a long time, the only surfactant templated materials produced were either silica or silica-based.

Some success has been achieved with a number of other materials by using additives that slow down the hydrolysis condensation reactions in aqueous solutions. Examples are: "Synthesis of Hexagonal Packed Mesoporous $TiO_2$ by a Modified sol-gel Method" Agnew. *Chem. Int. Edition English*, vol. 34 (1995), p2014–2017, D. M. Antonelli and J. Y. Ying, ibid, vol. 35 (1996) p426, M. Froba, O. Muth and A. Reller, "Mesostructured $TiO_2$: Ligand-stabilised Synthesis and Characterisation", *Solid State Ionics*, vols. 101–103 (1997), p249–253. A relevant patent is U.S. Pat. No. 5,958, 367 (J. Y. Ying, D. M. Antonelli, T. Sun).

A major advance was accomplished by Stuckey et. al., ("Generalised Synthesis of Large-pore Mesoporous Metal Oxides with Semicrystalline Frame works", P. Yang. D. Zhao, D. I. Margolese, B. F. Chmelka and G. D. Stucky, *Nature, vol.* 396 (1998), p152–155) who used alcohol-based solutions rather than aqueous solutions to form surfactant-templated structures. Hydrolosis-condensation reactions are much more easily controlled in alcohol solutions than aqueous solutions. Stucky et al. were therefore able to produce surfactant-templated structures with a range of inorganic metal oxides. Stucky, et. al. also reported that their materials exhibited some crystallinity in the organic phase. However the amount of crystallinity was still small, and the inorganic phase consisted of very small crystalline regions surrounded by amorphous inorganic material.

Surfactant-templated Structures via In-situ Reaction in Liquid Crystals

In this method, a solution of water and an organic precursor is mixed with an appropriate amount of surfactant, and this mixture is kept at a temperature where the surfactant organises to form a liquid crystal. The inorganic precursor then reacts to form inorganic material that occupies the space between the surfactant micelles. Finally the surfactant and any remaining water are removed by burning out or other methods.

Similar to the case for assembling surfactant structures, the inorganic reaction must take place while the surfactant structure is preserved. This again limits the temperature of the reaction, and the reaction must take place in an aqueous solution. Also, the reaction should not proceed prior to, or during, mixing with the surfactant.

The majority of research has used the same silicate hydrolysis-condensation reactions described in the self-assembly method. The liquid crystal structure is retained in the final product, as evidenced either by small angle XRD peaks or TEM. High angle XRD peaks, which would indicate atomic crystalline structures, are not present.

A different reaction method has been employed to produce cadmium sulfide, as outlined in "Semiconducting Superlattices templated by Molecular Assemblies", P. Braum, P. Osenar and S. I. Stupp, *Nature vol.* 380 (1996) p325–327, and "Countering Effects in Liquid Crystal Templating of Nanostructured CdS", V. Tohver et. al. *Chemistry of Materials* Vol 9, No. 7 (1997), p1495. Cadmium sulfate, cadmium chloride, cadmium perchlorate and cadmium nitrate aqueous solutions were mixed with surfactants to create liquid crystals. $H_2S$ gas was infused into the structure, which reacted with the dissolved cadmium ions to produce CdS. The liquid Crystal structure is retained in final product. Importantly, significant high-angle x-ray peaks are present indicating good atomic crystallinity.

Surfactant-templated Structures via Electrodeposition in Liquid Crystals

This method uses a similar principle to the surfactant-templating methods described above. An aqueous-based electroplating solution is mixed with surfactant at an appropriate concentration to form a liquid crystal. The mixture is placed between two electrodes, and kept at a temperature where the surfactant organises to form a liquid crystal. One of the electrodes is a substrate that is to be coated. Applying an appropriate voltage causes inorganic material to be deposited at one electrode. This material only deposits in the space between the surfactant. Upon completion of electrodeposition, the surfactant may be removed by heating or by dissolution in a solvent that does not attack the inorganic material.

The organised pore structure is maintained in this method. The deposited material is almost always metal, which is very easy to crystallise, therefore strong high-angle XRD peaks are observed. Platinum and tin have been produced by this technique.

As mentioned above, it is an aim of the surfactant-templating methods described above to produce solid material having a regular array of pores, with the pore structure having a very narrow pore size distribution (i.e. the pores are essentially of the same diameter). Most of the surfactant-templating processes described in the literature have resulted in the formation of inorganic particles having a particle size in excess of one micrometre. Crytallinity is difficult to obtain. Reaction times are lengthy because significant time is required to form the surfactant-inorganic structure in solution. Indeed, a number of published papers require time periods in the range of 1 day to 7 days to allow the desired surfactant-inorganic structure to develop. Furthermore, the conditions used to deposit the inorganic material in the surfactant structure must be "gentle" in order to avoid collapse of the surfactant structure.

Another approach to producing nanopowders is described in U.S. Pat. No. 5,698,483 to Ong et al. In this patent, a metal cation salt/polymer gel is formed by mixing an aqueous continuous phase with a hydrophilic organic polymeric disperse phase. When the hydrophilic organic polymer is added to the solution, the hydrophilic organic polymer absorbs the liquid on to its structure due to chemical affinity. The product is a gel with the metal salt solution "frozen" within the dispersed polymeric network. The salt/polymer network is calcined to decompose the powder, leaving a high surface metal oxide powder. The calcining temperature is stated to be from 300° C., preferably 450° C.

This patent requires that a hydrophilic organic polymer be used in the process for making metal oxide powders.

Other patents that describe the production of nanometre-sized powders include U.S. Pat. No. 5,338,834 (incorporate a metal salt solution into a polymeric foam and calcining the foam to remove organics and leave a powder) and U.S. Pat. No. 5,093,289 (a foam matrix is coated with a suspension of silicon powder, synthetic resin and solvent and is subject to a heat treatment during which the foam is expelled and the silicon is stabilized).

BRIEF DESCRIPTION OF THE DRAWINGS

A better understanding of the present invention can be derived by reference to the following specification and appended drawings, wherein.

The present inventors have now developed a method for producing particles, especially metal oxide particles.

In one aspect, the present invention provides a method of producing metal oxide particles having nano-sized grains, the method comprising the steps of:

(a) preparing a solution containing one or more metal cations;

(b) mixing the solution from step (a) with one or more surfactant under conditions such that micelles are formed; and (c) heating the mixture from step (b) above to form the particles.

Preferably, the particles are metal oxide particles and step (c) forms particles of metal oxide.

Any surfactant capable of forming micelles may be used in the present invention. A large number of surfactants may be used in the invention, inlcuding non-ionic sufactants, cationic sufactants, anionic surfactants and zwitterionic surfactants. Some examples include BRIJ $C_{16}H_{33}(OCH_2CH_2)_2OH$, designated $C_{16}EO_2$, (Aldrich); BRIJ 30, $C_{12}EO_4$, (Aldrich); BRIJ 56, $C_{16}EO_{10}$, (Aldrich); BRIJ 58, $C_{16}EO_{20}$, (Aldrich); BRIJ 76, $C_{18}EO_{10}$, (Aldrich); BRIJ 78, $C_{16}EO_{20}$, (Aldrich); BRIJ 97, $C_{18}H_{35}EO_{10}$, (Aldrich); BRIJ 35, $C_{12}EO_{23}$, (Aldrich); Triton X-100, $CH_3C(CH_3)_2CH_2C(CH_3)_2C_6H_4(OCH_2CH_2)_xOH, x=10(av)$, Aldrich); TRITON X-114, $CH_3C(CH_3)_2CH_2C(CH_3)_2C_6H_4(OCH)_2CH_2)_5OH$ (Aldrich); TWEEN 20, poly(ethylene oxide) (20) sorbitan monokayrate (Aldrich); TWEEN 40, poly(ethylene oxide) (20) sorbitan monopalmitate (Aldrich); TWEEN 60, poly (ethylene oxide)(20) sorbitan monostearate (Aldrich); TWEEN, poly(ethylene oxide) (20) sorbitan monooleate (Aldrich); and Span 40, orbitan monopalmitate (Aldrich), TERITAL TMN 6, $CH_3CH(CH_3)CH(CH_3)CH_2CH_2CH(CH_3)(OCH_2CH_2)_6OH$ (Fulka); TERGITAL TMN 10, $CH_3CH(CH_3)CH(CH_3)CH_2CH_2CH(CH_3)(OCH_2CH_2)_{10}OH$ (Fulka); block copolymers having a poly(ethylene oxide)-poly(propylene oxide)-poly(ethylene oxide) (EO-PO-EO)

sequence centered on a (hydrphobic) poly(propylene glycol) nucleus terminated by two primary hydroxyl groups; PLURONIC L121 $(_{Mav}=4400)$, $EO_5PO_{70}EO_5$ (BASF); PLURONIC L64 $(_{Mav}=2900)$, $EP_{13}PO_{30}EO_{13}$ (BASF); PLURONIC P65 $(_{Mav}=3400)$, $EP_{20}PO_{30}EO_{20}$ (BASF); PLURONIC P85 $(_{Mav}=4600)$, $EO_{26}PO_{39}EO_{26}$ (BASF); PLURONIC P103 $(_{Mav}=4950)$, $EO_{17}PO_{56}EO_{17}$ (BASF); PLURONIC P123 $(_{Mav}=5800)$, $EO_{20}PO_{70}EO_{20}$, (Aldrich); PLURONIC F68 $(_{Mav}=8400)$, $EO_{80}PO_{30}EO_{80}$ (BASF); PLURONIC F127 $(_{Mav}=12\ 600)$, $EO_{106}PO_{70}EO_{106}$ (BASF); PLURONIC F88 $(_{Mav}=11\ 400)$, $EO_{100}PO_{39}EO_{100}$ (BASF); PLURONIC 25R4 $(_{Mav}=3600)$, $PO_{19}EO_{33}PO_{19}$ (BASF); star diblock copolymers having four $EO_n$-$PO_m$ chains (or in reverse, the four $PO_n$-$EO_m$ chains) attached to an ethlenediamine nucleus, and terminated by secondary hydroxyl groups; TETRONIC 908 $(_{Mav}=25\ 000)$, $(EO_{113}PO_{22})_2NCH_2CH_2N(PO_{113}EO_{22})_2$ (BASF); TETRONIC 901 $(_{Mav}=4700)$, $(EO_3PO_{18})_2NCH_2CH_2N(PO_{18}EO_3)_2$ (BASF); and TETRONIC 90R4 $(_{Mav}=7240)$, $(PO_{19}EO_{16})_2NCH_2CH_2N(EO_{16}PO_{19})_2$ (BASF.)

The above sufactants are non-ionic surfactants. Other surfactants that can be used include:

Anionic suractant:

Sodium dodecyl sulfate $CH_3(CH_2)_{11}OSO_3NA$

There appears to be several manufacturers. Sigma is an example.

Cationic surfactants:

In this description the following marks are used as trade marks: PLURONIC surfactant; BRIJ surfactant; TRITON surfactant; TWEEN surfactant; SPAN surfactant; TERITAL surfactant; TERGITAL surfactant; and TETRONIC surfactant.

Cetyltrimethylammonium chloride $CH_3(CH_2)_{15}N(CH_3)_3Cl$ Aldrich

Cetyltrimethylammonium bromide $CH_3(CH_2)_{15}N(CH_3)_3BT$ Aldrich

Cetylpyridinium chloride $C_{21}H_{38}NCl$ Sigma.

This list should not be considered to be exhaustive.

Step (c) of the method of the present invention involves heating of the mixture from step (b) to an elevated temperature to thereby form the metal oxide particles. This step may optionally be preceded by a step of treating a solution to form a gel. Typically, it is sufficient to change the temperature of the mixture to form the gel. For some mixtures, cooling will result in gel formation. For other mixtures, heating will result in gel formation. This appears to be dependent upon the surfactant(s) used.

If the optional step of forming a gel is used in the method, the heating of step (c) involves heating the gel.

The heating step results in the formation of the metal oxide and the pore structure of the particles. Unlike prior art processes for producing metal oxides, the method of the present invention only requires a relatively low applied temperature. Indeed, applied temperatures of less than about 300° C. have been found to be suitable in experimental work conducted to date. Preferably, the maximum applied temperature reached in step (c) does not exceed about 600° C., more preferably about 450° C., most preferably about 300° C. The present inventors believe that the process of the present invention may involve localised exothermic reactions occurring, which could lead to highly localised temperatures. However, it remains a significant advantage of the present invention that the applied temperature is relatively low compared to prior art processes known to the inventors.

The heating step may involve a rapid heating to the maximum desired temperature, or it may involve a much more closely controlled heat treatment regime. For example, the heating step may involve heating to a drying temperature (generally below the boiling temperature of the mixture) to dry the mixture, following by a slow ramp up to the maximum applied temperature, or followed by a series of incremental increases to intermediate temperatures before ultimately reaching the maximum applied temperature. The duration of the heating step may vary widely, with a preferred time in step (c) being from 15 minutes to 24 hours, more preferably 15 minutes to 2 hours even more preferably 15 minutes to 1 hour. It will be appreciated that step (c) is intended to encompass all heating profiles that result in the formation of particles of metal oxide.

The metal oxide particles produced by preferred embodiments of the method have nano-sized grains. Preferably, the grain size falls within the range of 1–50 nm, more preferably 1–20 nm, even more preferably 2–10 nm, most preferably 2–8 nm.

The grain size was determined by examining a sample of the particles using TEM (transmission electron microscopy), visually evaluating the grain size and calculating an average grain size therefrom. The particles may have varying particle size due to the very fine grains aggregating or cohering together. The particle size may vary from the nanometer range up to the micrometer range or even larger. The particles may have large specific surface areas (for the particular metal oxide, when compared with prior art processes for making those particles) and exhibit a broad distribution of pore sizes.

The present invention also encompasses mental oxide particles. In a second aspect, the present invention provides metal oxide particles characterised in that the particles have a grain size substantially in the range from 1 to 50 nm Preferably, the grain size falls within the range of 1 to 20 nm more preferably 2 nm to 10 nm, more preferably 2 nm to 8 nm.

The particles are preferably substantially crystalline and contain only small or negligible amounts of amorphous material.

The particles preferably have other properties as described with reference to the particles described with reference to the first aspect of the invention.

DETAILED DESCRIPTION OF PREFERRED EMBODIMENTS OF INVENTION AND EXAMPLES

Preferred embodiments of the present invention involve the following steps:

(a) preparation of a concentrated aqueous solution containing metal cations of at least one metal (by "concentrated solution", it is meant that the metal cations are present in an amount of 90% or greater of the theoretical solubility limit in the particular solvent/solute system utilised);

(b) creation of a micellar liquid—the solution from step (a) is mixed with a surfactant at a temperature where the mixture forms a micellar liquid;

(c) (optional) formation of a gel—the temperature of the micellar liquid is altered to form a gel. The gel forms due to ordering of surfactant molecules or surfactant micelles; and (d) heat treatment—the heat treatment forms the metal oxides, removes all surfactant and creates the pore structure.

Example 1

Production of $CeO_2$

In order to demonstrate the method of the present invention, particles of $CeO_2$ were produced. The following procedure was used:

Step 1: A cerium nitrate solution containing 2.5 moles/liter cerium nitrate was prepared.

Step 2: 16g BRIJ 56 surfactant and 20 mls cerium nitrate solution were heated to ~80° C. At this temperature the surfactant is a liquid. The solution was added slowly to the surfactant liquid while stirring, to create a micellar liquid.

Step 3: The micellar liquid was cooled to room temperature. During the cooling the liquid transformed to a clear gel.

Figure 4:
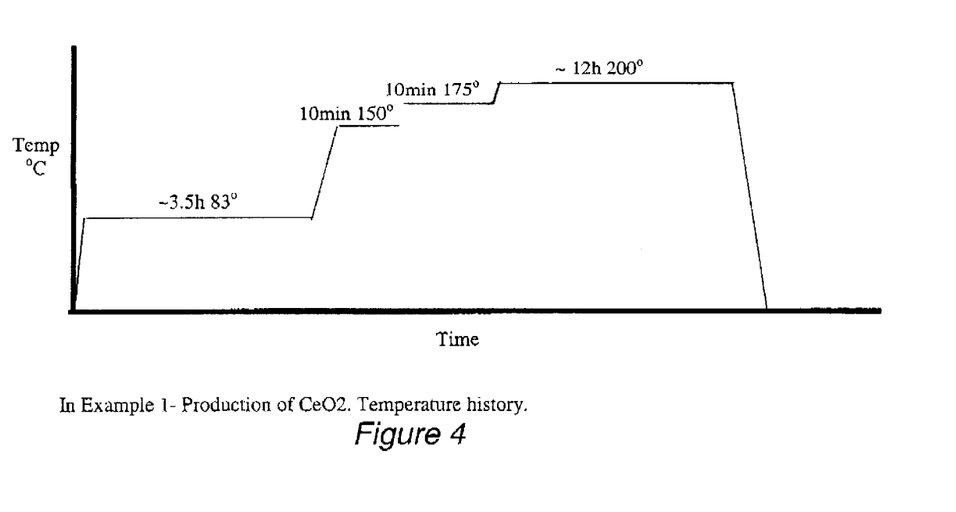
FIG. 4 is a temperature history profile for gel heat treatment in accordance with Example 1.

Step 4: The gel was heat treated according to temperature history presented in FIG. 4. In this example, an extended drying stage at 83° C. was used prior to further heating.

Figure 5:
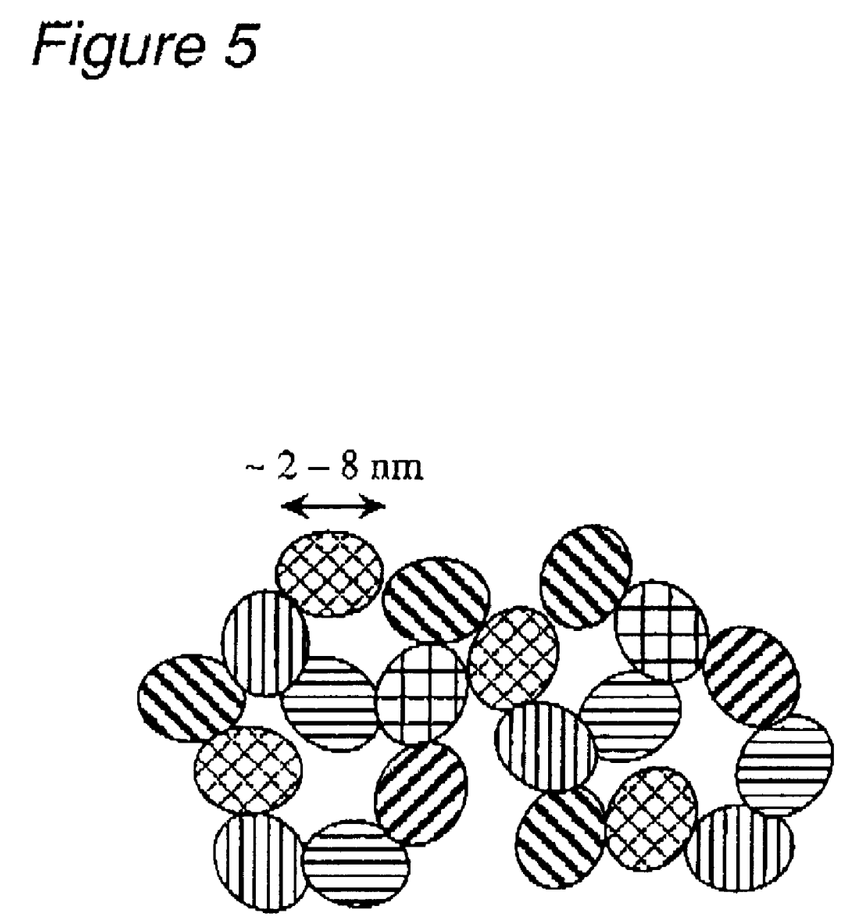
FIG. 5 is a schematic representation of cerium oxide powder consisting of lightly sintered aggregates of very fine grains.
Figure 10:
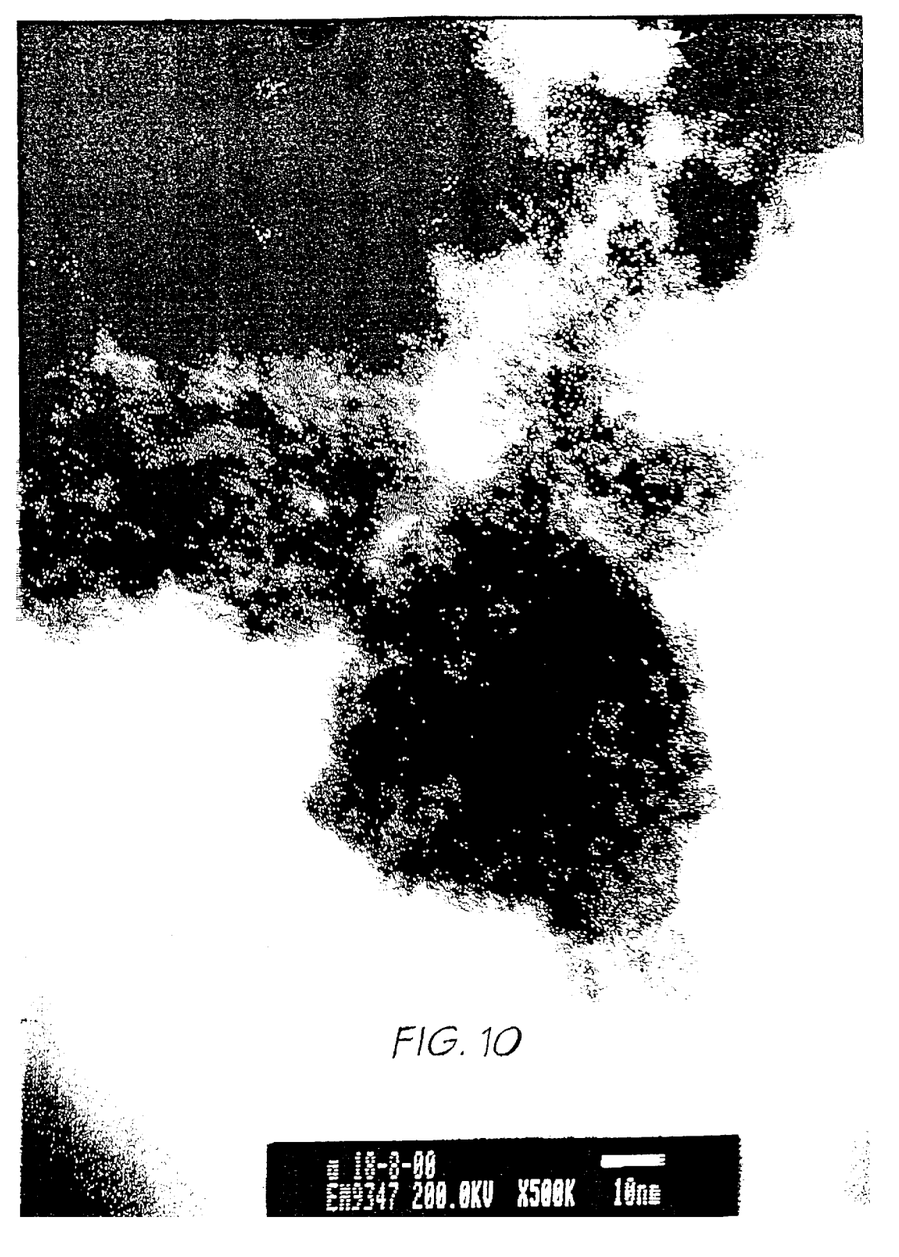
FIG. 10 is a transmission electron microscopy image of the product is schematically shown in FIG. 5.

The resulting $CeO_2$ powder had a surface area of ~253 $m^2/g$, and was comprised of grains that ranged between ~2 and ~8 nm in diameter. Transmission electron microscopy (TEM) suggests that the final powder consisted of lightly sintered aggregates of very fine grains. This is shown schematically in FIG. 5, and a TEM photomicrograph of the product is shown as FIG. 10.

FURTHER EXAMPLES

Several target metal oxide materials were chosen to test the capabilities of the process. Some of these materials are multi-component, complex metal oxides that are very difficult to form using conventional methods.

Ceria-based Compounds $CeO_2$, and other mixed oxides containing cerium and one or more of samarium, copper and zirconium $Ce_{0.6}Sm_{0.4}O_x$, $Ce_{0.65}Sm_{0.2}Cu_{0.15}O_x$, and $Ce_{0.6}Zr_{0.2}Sm_{0.1}Cu_{0.1}O_x$ have been produced. The oxygen content is represented by x since the exact content is dependent upon composition and is not precisely known at this stage. These materials are excellent candidates for catalytic applications, and may also be used on SOFC anodes. They are also a very useful test of the ability of the present invention to produce multicomponent oxides. All of these compositions should exhibit the basic crystal structure of $CeO_2$ if the different metal components are evenly distributed throughout the material. This is because the additional elements can be incorporated into the $CeO_2$ crystal structure. However, inhomogeneous distribution of elements may result in pockets of material that may have much higher concentrations of one or more particular elements. Such pockets can form different crystal structures (or phases).

X-ray diffraction has been used to determine whether the materials are single-phase $CeO_2$ crystal structure (evenly distributed elements), or contain additional crystal structures that would indicate poor mixing of elements. The surface areas and grain sizes of several materials have also been measured.

Figure 6:
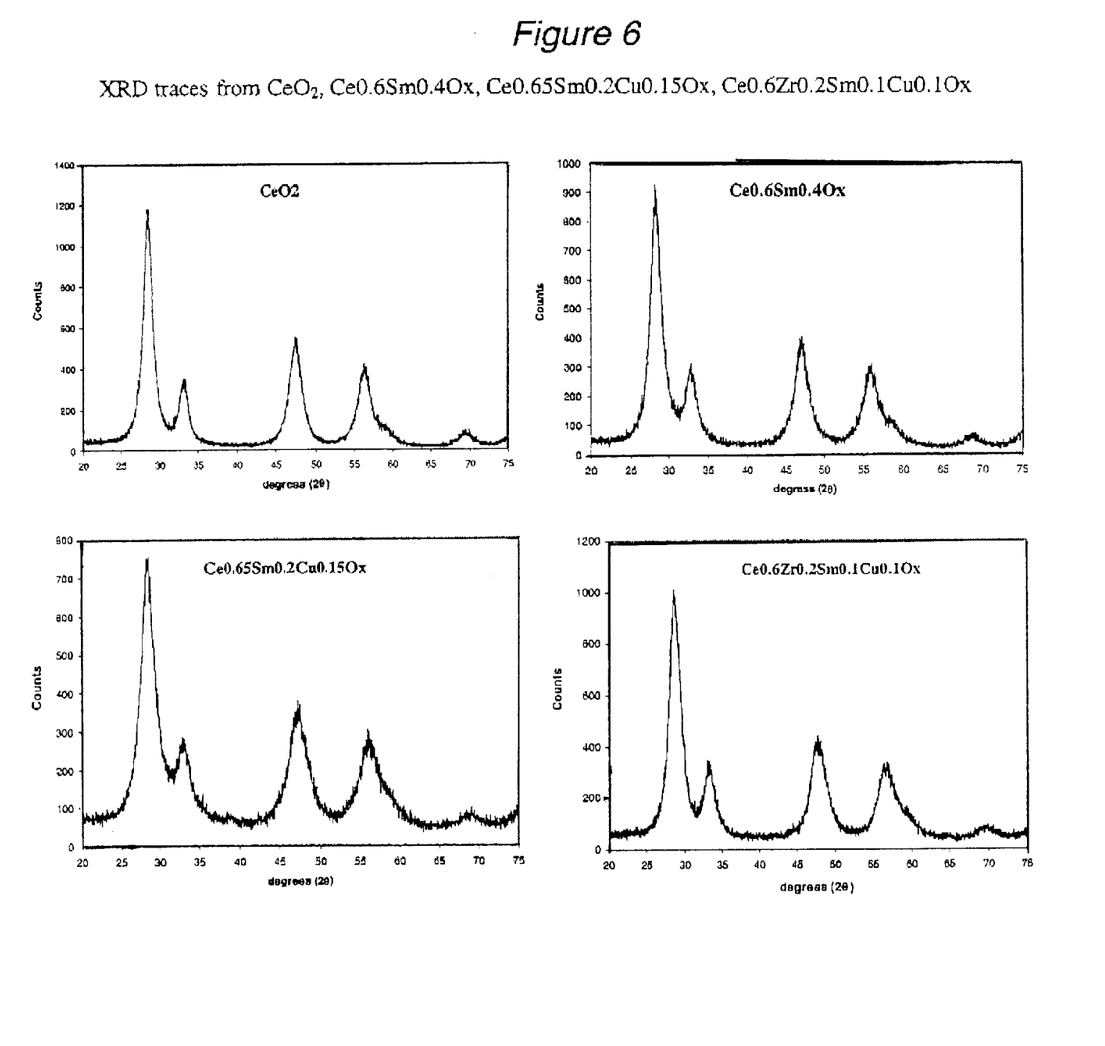
FIG. 6 is an X-ray diffraction trace from various ceria-based compounds.

FIG. 6 shows XRD traces from $CeO_2$, $Ce_{0.6}Sm_{0.4}O_x$, $Ce_{0.65}Sm_{0.2}Cu_{0.15}O_x$, and $Ce_{0.6}Zr_{0.2}Sm_{0.1}Cu_{0.1}O_x$ that were made using our process. The XRD traces showed that the correct $CeO_2$ crystal structure was obtained in all materials, even the four component system. This strongly suggests a very uniform distribution of elements. The width of the peaks indicates that the grain size is extremely small in all these materials.

The surface areas obtained for $CeO_2$, $Ce_{0.6}Sm_{0.4}O_x$, $Ce_{0.65}Sm_{0.2}Cu_{0.15}O_x$, using BRIJ 56 surfactant and non-optimal heat treatments, were 219, 145 and 171 $m^2/g$, respectively. $Ce_{0.6}SM_{0.4}O_x$ and $Ce_{0.65}Sm_{0.2}Cu_{0.15}O_x$ powders were a browny yellow colour from the Sm and Cu. They were held at 300° C. for longer than the $CeO_2$ to ensure that all surfactant was removed (with $CeO_2$, surfactant removal can be clearly observed via a change in colour from brown to yellow). This longer time at 300° C. was probably responsible for the lower surface areas in these materials, compared to $CeO_2$.

Figure 7:
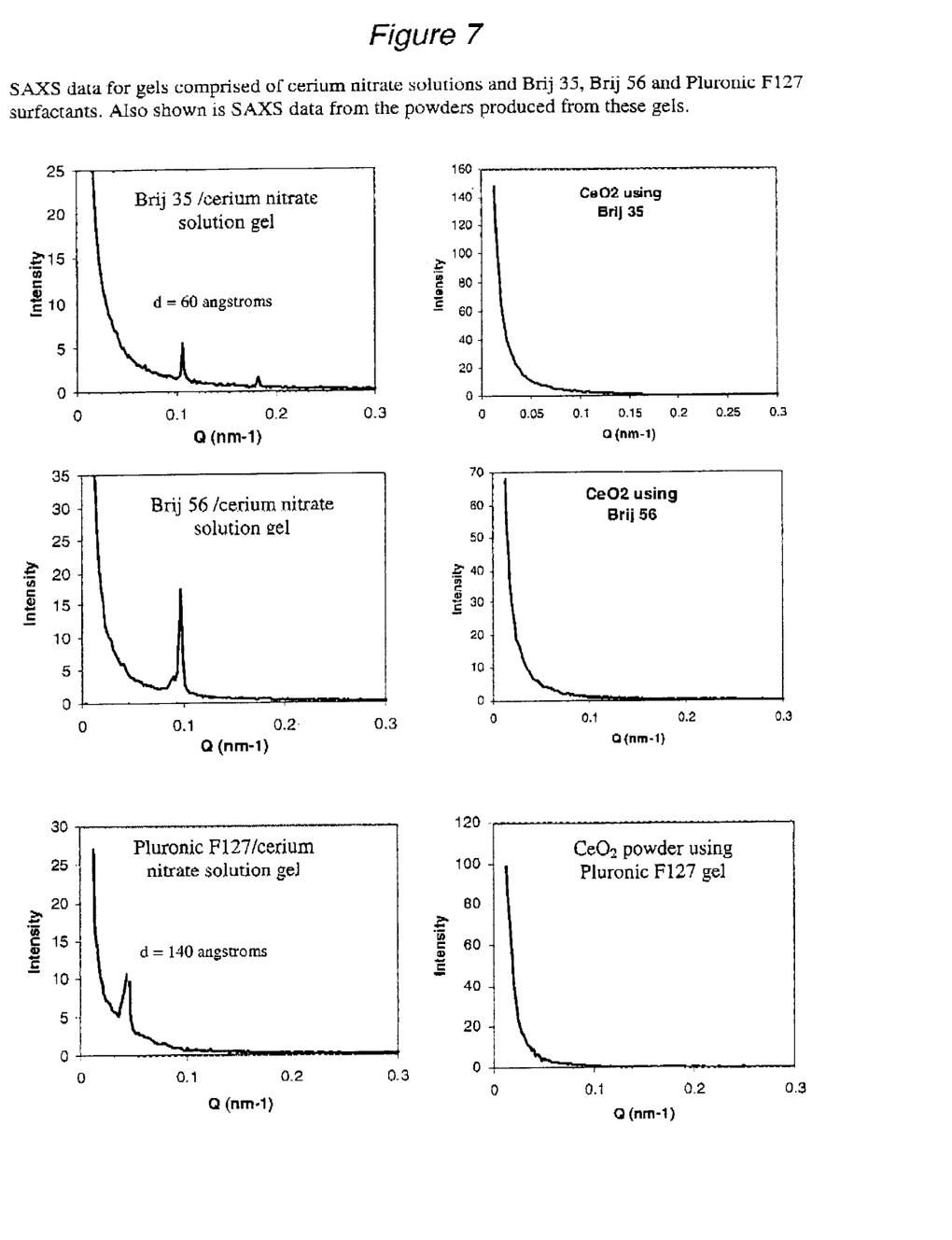
FIG. 7 illustrates small angle X-ray scattering data for gels comprised of cerium nitrate solutions.

The pore structure of the $CeO_2$ material, and its relationship to surfactant order in the gels, was further investigated. FIG. 7 shows small angle x-ray scattering (SAXS) data for gels comprised of cerium nitrate solutions and BRIJ 35, Brig 56 and PLURONIC F127 surfactants. Also shown are SAXS data for the powders produced from these gels. Significant peaks on the data from all three gels indicate the presence of ordered surfactant structures. This order is clearly not present in the final powders.

Figure 8:
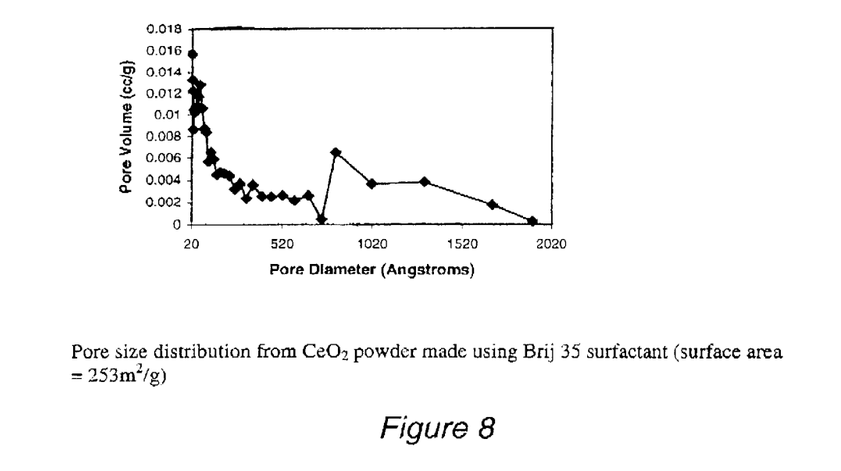
FIG. 8 is a graph of pore size distribution for a cerium oxide powder.
Figure 9:
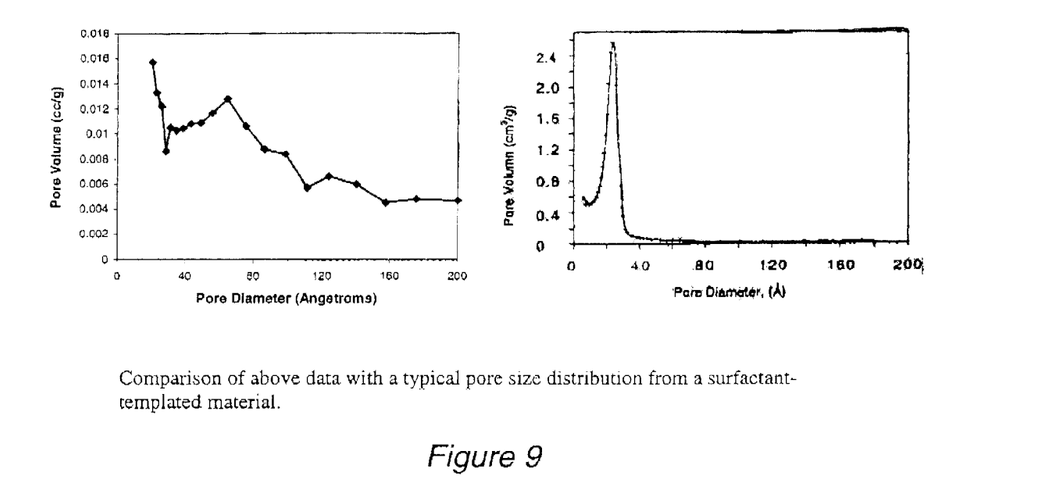
FIG. 9 is a comparison of typical pore size distribution from a surfactant-templated material.

Nitrogen adsorption was used to determine the pore-size distribution (FIG. 8). The distribution is very broad, indicating that the pore structure did not result simply by pores replacing surfactant micelles. The results arc compared to the pore size distribution obtained by Zhao et. al. (*J. Am. Chem. Soc.* vol. 120 (1998) p6024–6036) for surfactant-templated silica (using the same surfactant) in FIG. 9. The total pore volumes are similar when the different densities of silica and $CeO_2$ are taken into account. However, the pore size distribution is clearly much broader in the $CeO_2$ material. This indicates that the pores in the $CeO_2$ were not created simply by occupying the same space as the surfactant micelles, in contrast to surfactant-templated materials.

Transmission electron microscopy (TEM) of the $CeO_2$ material shows that the grain size is extremely small. The grains range between ~2 nm and ~6 nm in diameter (see the TEM micrograph print of FIG. 10). This is close to the limiting grain size, which is determined by the atomic 'unit cell' of a material. Typically, unit cell dimensions for metal oxides range between 1 and 2 nm.

Example

Preparation of $La_{0.6}Ca_{0.2}Nd_{0.2}Mn_{0.9}Ni_{0.1}O_3$ $La_{0.6}Ca_{0.2}Nd_{0.2}Mn_{0.9}Ni_{0.1}O_3$ is used as the cathode material in solid oxide fuel cells. It is also an excellent test material for the present invention because the target 'lanthanum manganate' crystal structure is extremely sensitive to chemical composition. Even small variations in composition result in the formation of different crystal structures. Therefore, the five different metal elements need to be evenly distributed on an extremely fine scale to produce small grains with the correct crystal structure.

Using co-precipitation and other conventional processes, previous researchers have had considerable difficulty in obtaining the correct crystal structure because of this sensitivity to composition. Careful co-precipitation, followed by long (10 h–48 h) heat treatments at high temperatures (800–1000° C.) have been necessary to attain the correct crystal structure in the prior art (variations in chemical composition can be alleviated by diffusion of atomic elements at these high temperatures). One result of this high temperature processing is that significant grain growth and sintering of grains occurs so that the surface areas obtained are very low and grain size is relatively large.

Figure 11:
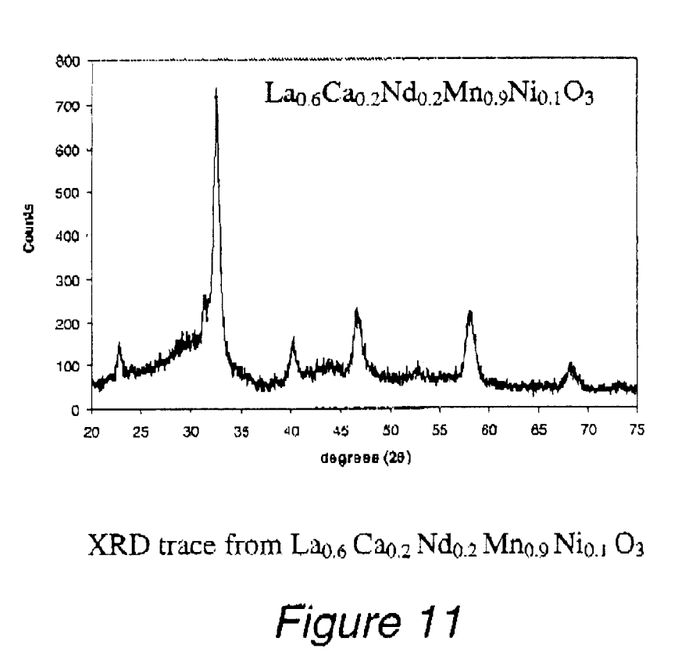
FIG. 11 shows an X-ray diffraction trace from a $La_{0.6}Ca_{0.2}Nd_{0.2}Mn_{0.9}Ni_{0.1}O_3$ material produced using the method of the present invention.

FIG. 11 shows an XRD trace from $La_{0.6}Ca_{0.2}Nd_{0.2}Mn_{0.9}Ni_{0.1}O_3$ material produced using the method of the present invention. A PLURONIC F127—metal nitrate solution gel was used, and the heat treatment consisted of 1 hour at 100° C., followed by 0.5 hour at 300° C. The trace indicates that the material is the targeted lanthanum manganate crystal structure. This is an amazing result given the very low temperatures used for heat treatment. A surface area of ~30 m$^2$/g was obtained for this material. While 30 m$^2$/g is much lower than the values for CeO$_2$-based materials, it is considered very high for this material. Recently, a surface area of 55 m$^2$/g was achieved from the present method using metal acetate solutions instead of metal nitrates, indicating that significant improvements may yet be achieved. This result also indicates that use of different salts, i.e., nitrates, acetates, etc, may give different surface area results.

Figure 12:
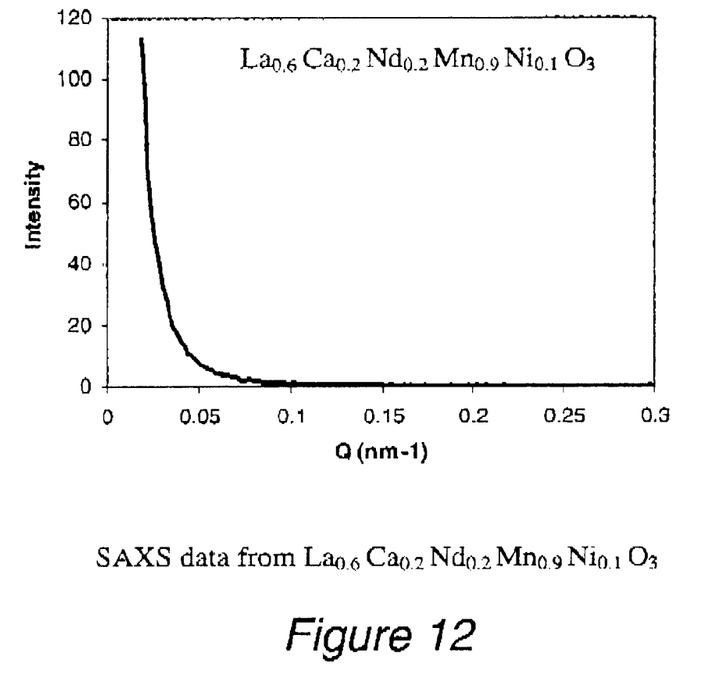
FIG. 12 is an SAXS data from the material of FIG. 11.

SAXS data for this material is shown in FIG. 12. As for the CeO$_2$ materials, there are no peaks on the SAXS data, indicating a lack of order in the pore structure.

The experimental work conducted to date by the present inventors has used metal cation solutions having a high concentration of dissolved metal. Experiments conducted to date have used metal salt solutions that are close to the solubility limits in order to attain the best yield. However, it is to be understood that the present invention should not be considered to be limited to using concentrated solutions of metal cations.

Experiments in Step 2

Mixing the Solution With Surfactant

Four different types of surfactant have been trialed: BRIJ 30, BRIJ 35, BRIJ 56 and PLURONIC F127. The BRIJ surfactants are mixed at high temperatures where they form micellar liquids with aqueous solutions, and can be cooled to form gels. With these surfactants it is possible to heat-treat straight from the micellar liquid stage without forming a gel. In contrast, PLURONIC surfactants form micellar liquids in aqueous solutions at low temperatures (~0° C.) and form gels upon heating. It is therefore not possible to heat-treat PLURONIC F127 mixtures without first forming a gel.

For CeO$_2$ materials, BRIJ 30, BRIJ 35 and BRIJ 56 surfactants produced much higher surface areas (>200 m$^2$/g) than PLURONIC F127 surfactant (~30 m$^2$/g). The inventors are unsure of the reason for this. It appears that BRIJ 56 may produce higher surface areas than BRIJ 35 however more investigations using a range of heat treatments are needed to confirm this.

For La$_{0.6}$Ca$_{0.2}$Nd$_{0.2}$Mn$_{0.9}$Ni$_{0.1}$O$_3$ material, the situation was reversed. Using metal nitrate solutions, PLURONIC F127 resulted in a surface area of ~30 m$^2$/g, while the BRIJ surfactants yielded <10 m$^2$/g.

Although the reasons for achieving differences in surface areas are not yet understood, the present invention does appear to provide the ability to produce materials with different surface areas. This may be a further advantage of the present invention. For example, for many metal oxide applications, it is necessary to manufacture a solid ceramic device with minimal porosity (eg the solid electrolyte in solid oxide fuel cells). In these applications, a high surface area is not important or even desirable. However, fine grains can still be advantageous since they reduce sintering temperatures and may deliver improved physical properties. It appears that the method of the present invention can be tailored to suit these applications, as well as applications that require porous, high surface area materials.

The present inventors also believe that the concentration of surfactant will certainly affect the resultant materials produced by the method of the present invention. As yet, no experimental work confirming this has been conducted.

The heat treatment step of the present invention sees the metal oxides and the pore structures both being formed during this stage.

In the experiments conducted by the present inventors to date, which mainly related to the production of metal oxides from nitrate solutions, the inventors have postulated that a high density of finely spaced micelles present in the micellar liquid probably hinders growth of precipitates, which may explain the very small grain sizes that have been obtained. The confined spaces between micelles may also prevent any large scale separation of different metal elements. It is believed that the metal nitrates decompose, as evidenced by emissions of nitrous oxide (Nox) gases. It is believed that the latter stages of the heat treatment involve a combustion reaction, which may burn at least part of the surfactant out of the product.

It will be realised that the above mechanism is only a postulated mechanism and the present invention should not be construed as being limited to that particular mechanism.

The present inventors are also unsure as to the mechanisms that lead to the high surface area or pore structures being formed. The very broad pore size distributions show that the pores are not simply created in spaces that were occupied by the micelles. The present inventors believe that it is possible that the segregation of liquid and precipitated nitrates into confined spaces between micelles, and gases released from nitrate decomposition and/or surfactant decomposition, combine to form the high surface area of pore structures. Again, the present inventors have only postulated this mechanism and the present invention should not be construed as being limited to this particular mechanism.

Figure 13:
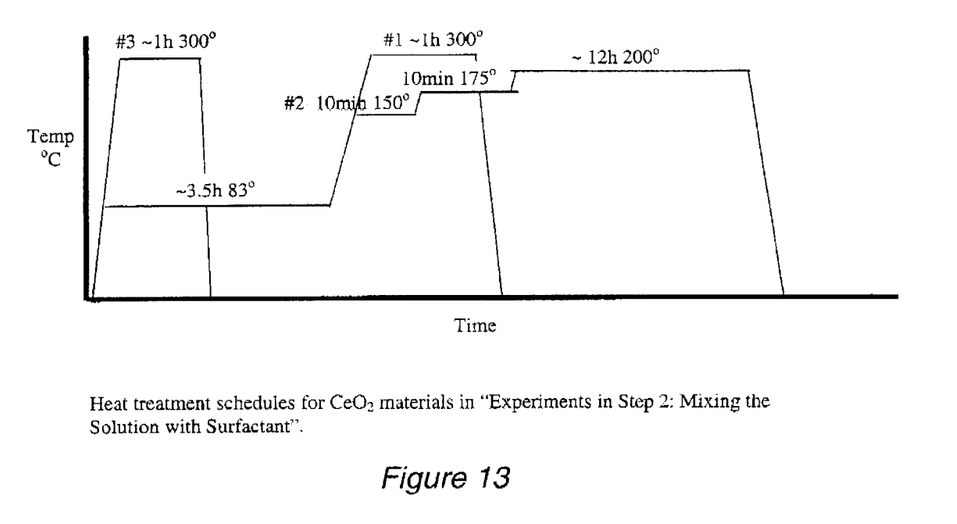
FIG. 13 shows heat treatment schedules for $CeO_2$ materials.

A range of heat treatments were applied to cerium nitrate solution/surfactant gel to try to gain some understanding of bow various heat treatment parameters affect the surface areas of the final powders. These heat treatment regimes are shown in FIG. 13.

Heat treatment no. 1 was designed to produce a dried gel, and to combust this dried gel extremely rapidly. Heat treatment no. 2 again produced a dried gel, however the combustion was designed to be much more controlled than for heat treatment no. 1. Heat treatment no. 3 did not produce a dried gel prior to further heating and was the simplest and quickest of the three heat treatments. It is therefore particularly attractive as a commercial process.

In heat treatment no. 1, during the long, low temperature stage, the gel dried into a hard, yellow mass. A significant number of bubbles evolved and were trapped in the mass at this stage When placed upon a hot plate at 300° C., the dried gel ignited immediately and violently to form a yellow powder. The powder was cerium oxide with a surface area of 170 m$^2$/g.

With heat treatment no. 2, the dried gel softened and partly turned to liquid at about 100° C., then significant NO$_x$ gas was released, and finally a slow combustion reaction occurred. The combustion reaction was evidenced by a slowly moving red front. A browny-yellow powder was present after combustion. Over time at approximately 200° C., this powder turned more yellow, probably due to burn-off of residual surfactant. The final cerium oxide powder had a surface area of 253 m$^2$/g.

Heat treatment no. 3—the gel turned to liquid shortly after placement on the hot plate. Evaporation of water and emission of N$_t$ gas followed. A grey-brown-yellow mass result. Finally, a slow combustion reaction again proceeded along a red front, turning the mixture black then browny-yellow. Over time at approximately 300° C., this powder turned more yellow, probably due to burn-off of residual surfactant. This heat treatment produced cerium oxide powder with the surface area of 219 m$^2$/g.

These experiments clearly showed the importance of heat treatment in determining the final properties of the powders. Very rapid combustion resulted in the lowest surface area. Slower heating and combustion of a dried gel resulted in the highest surface area Simply placing a wet gel on the hot plate also produced a very high surface area. These general trends were also observed in other experiments with different surfactants and different materials.

The present invention provides the following advantages over the prior art known to the resent inventors:

(a) the metal oxides produced have extremely small grain sizes. For example, cerium dioxide materials have grain sizes ranging between about 2 and about 10 nanometers;

(b) the metal oxides produced are highly crystalline, ie they have a high degree of atomic order. This is an important advantage over most surfactant-templated materials, which have almost no atomic crystallinity;

(c) extremely high surface areas may be obtained for some metal oxides (compared to prior art processes). The surface areas of the resultant powders are dependent upon the type of surfactant used, the type of metal ions, and the heat treatment. It also appears that the type of salt (eg nitrate, acetate, chloride, etc) may influence the surface area;

(d) very complex, multi-component metal oxides can be produced using the present invention. This indicates that different atomic species are evenly distributed throughout the material;

(e) low applied temperatures (less than about 300° C.) are sufficient to form even multi-component metal oxides. Indeed, the present inventors have literally conducted the majority of their experiments to date on a hot plate. This is a major advantage over other techniques, particularly for the production of multi-component metal oxides, which normally require heat treatments at high applied temperatures (approximately 1,000° C.) for extended periods to obtain the correct metal oxide phase. In particular, this has apparent benefits in reduced capital costs for furnaces, reduced operating expenses and avoiding undesirable sintering and grain growth that would occur at the high temperatures.

(f) the process is extremely rapid. The inorganic reaction and entire heat treatment may be done in as little as 30 minutes. This compares with conventional techniques that require long heat treatments (in some cases, up to several days). The long inorganic reactions that are characteristic of surfactant-templating methods are not used and therefore the present invention is much quicker than surfactant-templating processes;

(g) the process uses low cost raw materials and simple processing technology. It is therefore extremely inexpensive;

(h) in cases where heating of a gel is conducted, the gels consist of ordered surfactant structures. However, this ordered structure is definitely not present in the final materials In addition, pore size distributions are very broad, indicating that the pores do not result from simple burn-out of surfactant micelles. The pore structure is therefore significantly different to that in the surfactant-templated materials described previously.

Those skilled in the art will appreciate that the present invention may be susceptible to variations and modifications other than those specifically described. It is to be understood that the present invention encompasses all such variations and modifications that fall within its spirit and scope.

What is claimed is:

1. A method of producing metal oxide particles having nano-sized grains, said method consisting essentially of:

(a) preparing a solution containing one or more metal cations;

(b) mixing the solution from step (a) with surfactant under conditions such that surfactant micelles are formed within the solution to thereby form a micellar liquid; and (c) heating the micellar liquid from step (b) above to form metal oxide, the heating step being undertaken at a temperature and for a period of time to remove the surfactant and thereby form metal oxide particles having a disordered pore structure.

2. A method as claimed in claim 1 wherein the metal oxide particles are comprised of at least two metal ions and different atomic species in the particles are evenly distributed therein.

3. A method as claimed in claim 1 further comprising, before step (c), the step of treating the micellar liquid formed in step (b) to form a gel, said gel forming due to ordering of surfactant micelles or surfactant molecules.

4. A method as claimed in claim 1 wherein the solution containing one or more metal cations is a concentrated solution of metal cations.

5. A method as claimed in claim 1 wherein the one or more metal cations are selected from the group consisting of metal cations from Groups 1A, 2A, 3A, 4A, 5A, and 6A of the Periodic Table, transition metals, lanthanides, actinides, and mixtures thereof.

6. A method as claimed in claim 1 wherein the surfactant is selected from the group consisting of non-ionic surfactants, cationic surfactants, anionic surfactants and zwitterionic surfactants.

7. A method as claimed in claim 1 wherein step (c) comprises heating the micellar liquid to a maximum applied temperature not exceeding 600° C.

8. A method as claimed in claim 7 wherein the maximum applied temperature does not exceed 450° C.

9. A method as claimed in claim 7 wherein the maximum applied temperature does not exceed 300° C.

10. A method as claimed in claim 1 wherein the grain size of the particles fall within the range of 1–50 nm.

11. A method as claimed in claim 10 wherein the grain size falls within the range of 1–20 nm.

12. A method as claimed in claim 10 wherein the grain size falls within the range of 2–10 nm.

13. A method as claimed in claim 10 wherein the grain size falls within the range of 2–8 nm.

14. A method as claimed in claim 1 wherein the particles are crystalline.

* * * * *